(12) United States Patent
Burczyk et al.

(10) Patent No.: US 9,896,056 B2
(45) Date of Patent: Feb. 20, 2018

(54) PASSENGER PROTECTION DEVICE FOR A VEHICLE, AND VEHICLE

(71) Applicant: DAIMLER AG, Stuttgart (DE)

(72) Inventors: Christian Burczyk, Stuttgart (DE); Bengt Larsson, Sindelfingen (DE); Uwe Merz, Stuttgart (DE)

(73) Assignee: DAIMLER AG, Stuttgart (DE)

( * ) Notice: Subject to any disclaimer, the term of this patent is extended or adjusted under 35 U.S.C. 154(b) by 0 days.

(21) Appl. No.: 15/118,226

(22) PCT Filed: Feb. 7, 2015

(86) PCT No.: PCT/EP2015/000257
§ 371 (c)(1),
(2) Date: Aug. 11, 2016

(87) PCT Pub. No.: WO2015/120970
PCT Pub. Date: Aug. 20, 2015

(65) Prior Publication Data
US 2017/0174172 A1 Jun. 22, 2017

(30) Foreign Application Priority Data
Feb. 12, 2014 (DE) .......................... 10 2014 001 952

(51) Int. Cl.
*B60R 21/233* (2006.01)
*B60R 21/264* (2006.01)
(Continued)

(52) U.S. Cl.
CPC .......... *B60R 21/233* (2013.01); *B60R 21/217* (2013.01); *B60R 21/264* (2013.01);
(Continued)

(58) Field of Classification Search
CPC combination set(s) only.
See application file for complete search history.

(56) References Cited

U.S. PATENT DOCUMENTS

| 4,076,277 A | 2/1978 | Kuwakado et al. | |
| 5,738,368 A * | 4/1998 | Hammond | B60N 2/68 |
| | | | 280/730.1 |

(Continued)

FOREIGN PATENT DOCUMENTS

| CN | 1347372 A | 5/2002 |
| CN | 1762743 A | 4/2006 |

(Continued)

OTHER PUBLICATIONS

International Search Report dated Apr. 29, 2015 in related International Application No. PCT/EP2015/000257.

(Continued)

*Primary Examiner* — Nicole T Verley
(74) *Attorney, Agent, or Firm* — Patent Portfolio Builders PLLC

(57) ABSTRACT

A passenger protection device for a vehicle includes an airbag assigned to at least one passenger in a rear compartment of the vehicle. The airbag can be activated and filled with a gas in the event of an imminent collision of the vehicle being detected or in the event of a collision. The airbag is formed such that that it is deployed in the activated and filled condition between a front vehicle seat and an upper body region, as well as a between the front vehicle seat and a knee and lower leg region of the passenger.

17 Claims, 3 Drawing Sheets

Figure 1:
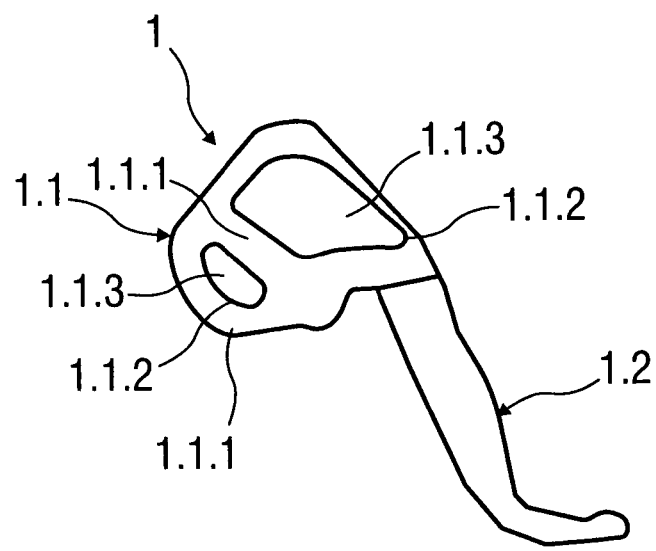

(51) Int. Cl.
*B60R 21/217* (2011.01)
*B60R 21/231* (2011.01)
*B60R 21/00* (2006.01)

(52) U.S. Cl.
CPC .............. *B60R 2021/0044* (2013.01); *B60R 2021/0048* (2013.01); *B60R 2021/0051* (2013.01); *B60R 2021/23153* (2013.01); *B60R 2021/23169* (2013.01)

(56) References Cited

U.S. PATENT DOCUMENTS

| | | | | |
|---|---|---|---|---|
| 6,142,521 A | * | 11/2000 | Shephard | B60R 19/00 280/728.1 |
| 6,557,887 B2 | | 5/2003 | Wohllebe | |
| 8,622,417 B1 | * | 1/2014 | Schneider | B60R 21/2338 280/729 |
| 8,651,518 B2 | * | 2/2014 | Shamoto | B60N 2/289 280/730.2 |
| 8,998,252 B2 | | 4/2015 | Hirth et al. | |
| 9,308,883 B1 | * | 4/2016 | Schneider | B60R 21/231 |
| 9,446,733 B2 | * | 9/2016 | Pausch | B60R 21/231 |
| 2004/0174003 A1 | * | 9/2004 | Dominissini | B60R 21/233 280/729 |
| 2011/0031722 A1 | * | 2/2011 | Baumann | B60R 21/231 280/728.1 |
| 2012/0126516 A1 | * | 5/2012 | Choi | B60R 21/207 280/730.2 |
| 2012/0133114 A1 | * | 5/2012 | Choi | B60R 21/214 280/728.2 |
| 2012/0193896 A1 | * | 8/2012 | Turnbull | B60R 21/233 280/729 |
| 2013/0341975 A1 | * | 12/2013 | Schneider | B64D 11/06 297/163 |
| 2014/0008902 A1 | * | 1/2014 | Schneider | B60R 21/2338 280/741 |
| 2015/0203066 A1 | * | 7/2015 | Pausch | B60R 21/231 280/730.1 |
| 2016/0107598 A1 | * | 4/2016 | Fischer | B60R 21/231 280/729 |

FOREIGN PATENT DOCUMENTS

| | | | |
|---|---|---|---|
| CN | 101312860 A | | 11/2008 |
| CN | 101767568 A | | 7/2010 |
| DE | 19540911 A1 | | 5/1997 |
| DE | 19916848 A1 | | 10/2000 |
| DE | 102006038125 A1 | | 2/2008 |
| DE | 102012019900 A1 | | 5/2013 |
| EP | 1650087 B1 | | 11/2008 |
| EP | 1951560 B1 | | 7/2009 |
| JP | 200596654 A | * | 4/2005 |
| JP | 2005096653 A | | 4/2005 |
| JP | 4176556 B2 | * | 11/2008 |
| JP | 4180415 B2 | * | 11/2008 |
| JP | 4600768 B2 | * | 12/2010 |
| JP | 2016088413 A | * | 5/2016 |
| JP | 5999031 B2 | * | 9/2016 |
| KR | 20120103103 A | | 9/2012 |
| KR | 101272913 B1 | | 6/2013 |
| WO | 2014016432 A1 | | 1/2014 |
| WO | WO 2016087009 A1 | * | 6/2016 ........... B60R 21/207 |

OTHER PUBLICATIONS

Office Action dated Nov. 26, 2014 in related DE Application No. 10 2014 001 952.7.
Written Opinion dated Apr. 29, 2015 in related International Application No. PCT/EP2015/000257.
Office Action dated Jun. 28, 2017 in related CN Application No. 201580007811.7 (references JP 2005096653, WO 2014016432, and U.S. Pat. No. 4,076,277 previously cited in IDS filed on Aug. 11, 2016.

* cited by examiner

PASSENGER PROTECTION DEVICE FOR A VEHICLE, AND VEHICLE

BACKGROUND AND SUMMARY OF THE INVENTION

Exemplary embodiments of the invention relate to a passenger protection device for a vehicle, which comprises an airbag assigned to at least one passenger in a rear compartment of the vehicle and which is able to be activated and filled with a gas in the event of an imminent collision of the vehicle being detected or in the event of a collision. Exemplary embodiments of the invention furthermore relate to a vehicle having such a passenger protection device.

German patent document DE 10 2006 038 125 A1 discloses a restraint system for a motor vehicle, which is deployed from a storage position into a retaining position. The deployment takes place by means of least one support structure that is inflatable by a gas pressure source. A bearing volume of the restraint system holds back the passenger in his/her direction of displacement. The bearing volume is thereby encased by at least one flexible bearing structure. In order to adjust a size of the retaining system to the respective load case, the flexible bearing structure is stretched to encase a bearing volume by inflating the support structure.

Exemplary embodiments of the invention are directed to an improved passenger protection device for a vehicle compared to prior art and a vehicle having such a passenger protection device.

A passenger protection device for a vehicle comprises an airbag assigned to at least one passenger in a rear compartment of the vehicle and is able to be activated and filled with a gas in the event of an imminent collision of the vehicle being detected or in the event of a collision. According to the invention, the airbag is formed in such a way that it is deployed in the activated and filled condition between a front vehicle seat and an upper body area, as well as a knee and lower leg area, of the passenger.

In particular, protection for a passenger not wearing a seat belt in the event of a collision of the vehicle is increased by means of such a passenger protection device, wherein a risk of injury of the passenger is at least reduced. By means of such a passenger protection device arranged in the vehicle, it is possible for the passenger in the rear compartment to take off his/her seat belt, for example in the event of a straight tailback of the vehicle, such that comfort for the passenger with a corresponding protective effect ensured by the airbag and the resulting degree of safety can be improved.

As a protective effect for the passenger, he/she is able to be fastened to his/her vehicle seat at least in sections by means of the airbag such that the risk of the passenger accelerating in the direction of the front vehicle seat due to the collision is at least reduced, wherein the acceleration energy is at least partially able to be absorbed by the airbag.

The passenger protection device formed as such an airbag thereby combines, in particular, protection measures for a pelvic area and a knee and lower leg area of the passenger.

In one embodiment, the airbag has at least one support structure that can be filled with the gas in a first region assigned to the upper body area of the passenger, by means of which support structure bearing structures encasing at least one bearing volume are able to be stretched and an adjacent second region assigned to the knee and lower leg area is formed as a single chamber-like fillable region.

Due to such a formation of the first region of the airbag assigned to the upper body region, a gas volume is reduced, wherein, at the same time, a force acting during deployment of the airbag can be reduced by such a formation. Thus, a depth of the region assigned to the upper body is adjusted depending on a position of the front vehicle seat, in particular the seat backrest thereof. The impact energy of the passenger is able to be absorbed to the greatest extent possible by the bearing volume, wherein the bearing volume is formed when the support structures are filled by sucking in surrounding air.

In a further embodiment, the first region of the airbag substantially assigned to the upper body region of the passenger comprises two bearing volumes formed by the support and bearing structures. This first region of the airbag is therefore formed to be relatively stable, whereby energy acting on the airbag through the impact of the passenger is able to be absorbed in an improved manner.

In an alternative or additional embodiment, the first region of the airbag is formed in such a way that, in the event of a collision of the vehicle, the head and chest of the passenger are supported by the deployed first region of the airbag in such a way that reduces loads of the head and neck caused by the collision. An embodiment of the first region of the airbag preventing or at least minimizing a relative movement between the head and chest during support is therefore particularly advantageous.

In one development of the passenger protection device, the airbag extends in the filled and deployed condition at least over a width of the front vehicle seat. A protective effect of the airbag is thus ensured for the passenger sitting behind the front vehicle seat, substantially over the width of the front vehicle seat. Since the airbag extends over the entire width of the front vehicle seat, it is not absolutely necessary for the passenger to be in a predetermined position with respect to the airbag.

In one embodiment, the passenger is fastened at least in sections to his/her vehicle seat by the airbag, wherein, in particular, a pelvic region of the passenger is able to be supported by the activated and deployed airbag and the passenger is thus able to be positioned in his/her vehicle seat. At the same time, by supporting the pelvic area, in particular in the case of a passenger who has put on the seat belt, the risk of sliding under the seat belt, the so-called submarining effect, is at least reduced.

In one possible development, the bearing volume is formed by the support structure and the bearing structures, wherein the bearing volume is encased by the bearing structures. The bearing volume is thus able to be formed during deployment of the airbag and serves for the retention of the passenger.

In one possible embodiment, the support structure is formed to be tubular, whereby a space provided for filling is reduced and relatively little gas is required for the deployment of the airbag. The time period for deployment of the airbag is thereby reduced at the same time, such that the protective effect for the passenger can be achieved relatively quickly.

In order to make it possible for the passenger to be fastened to his/her vehicle seat by the activated and completely deployed airbag, a gas generator for filling the airbag with the gas is attached to the vehicle floor in a footwell assigned to the vehicle seat. The airbag is thus deployed upwards from below.

In a further embodiment, at least some sections of the gas generator are arranged below the front vehicle seat, wherein the gas generator is arranged in such a way that legroom of the passenger in the vehicle seat is not restricted because of the gas generator, but also in such a way that complete deployment of the airbag is not hindered.

In one possible embodiment, the airbag is directly attached to the gas generator, such that the airbag is deployed upwards from below and no further components are required for the fluidic connection of the airbag to the gas generator.

Furthermore, the invention relates to a vehicle having such a passenger protection device, which comprises an airbag formed in such a way for a passenger in the rear compartment of the vehicle.

BRIEF DESCRIPTION OF THE DRAWING FIGURES

Exemplary embodiments of the invention are illustrated in greater detail below by means of drawings.

Figure 2:
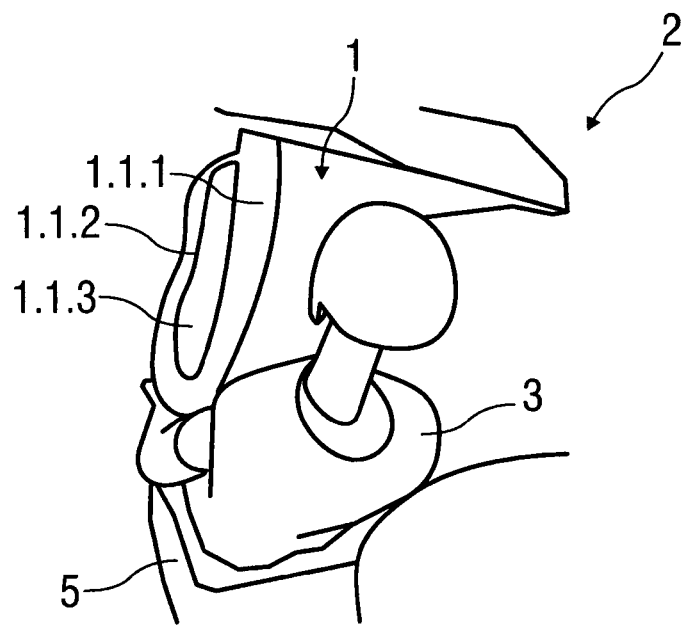
Figure 3:
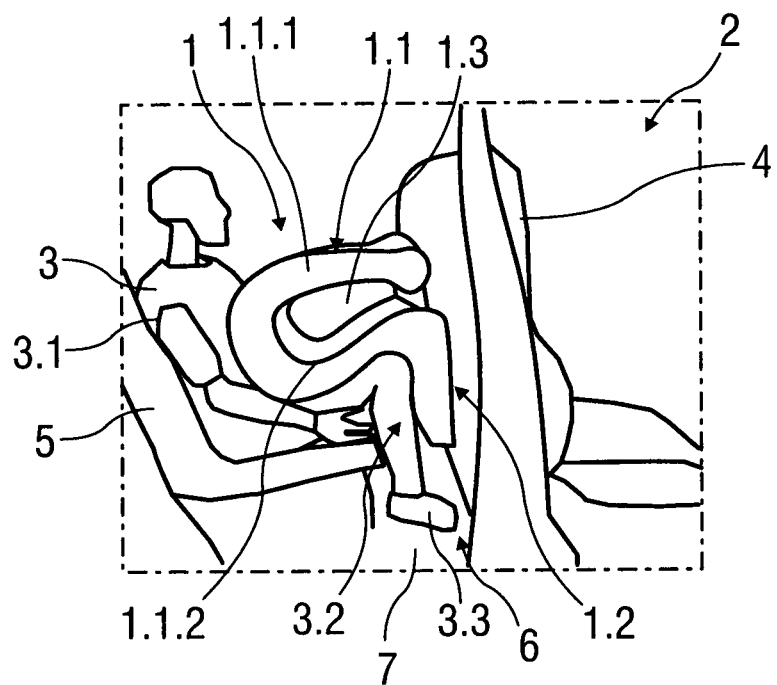
Figure 4:
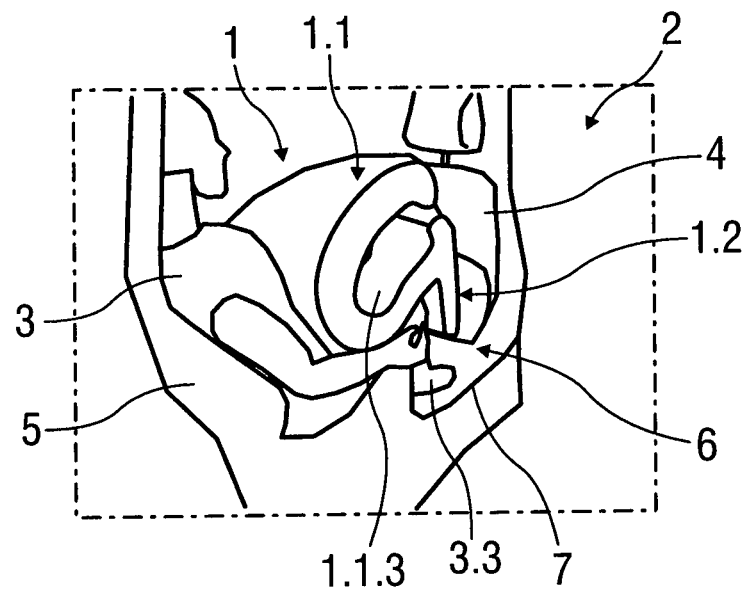
Figure 5:
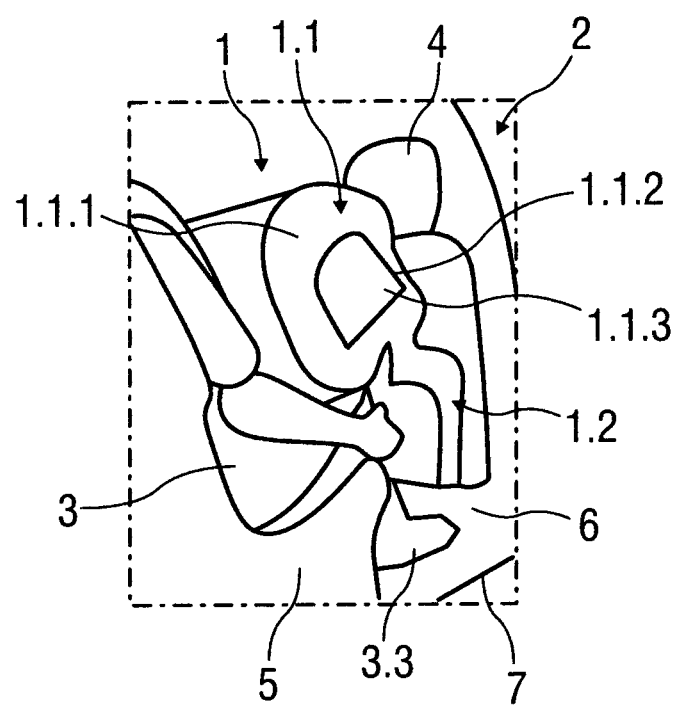

Here are shown:

FIG. 1 schematically, a side view of a first embodiment of an airbag for a rear compartment of a vehicle, FIG. 2 schematically, in a perspective view, a top view of a passenger and an activated airbag in a second embodiment, FIG. 3 schematically, a side view of the passenger with the activated airbag in the second embodiment, FIG. 4 schematically, a perspective view of the passenger and the activated airbag in the second embodiment and FIG. 5 schematically, a further perspective view of the passenger and the activated airbag in the second embodiment.

Parts that correspond to one another are provided with the same reference numerals in all figures.

DETAILED DESCRIPTION

FIG. 1 shows a side view of a passenger protection means of a passenger protection device formed as an airbag 1 for a vehicle 2, which is depicted partially in the following figures. Here, the airbag 1 is shown in a first embodiment.

The airbag 1 is assigned to a passenger 3 in the rear compartment of the vehicle 2 shown in the following figures and has two regions 1.1 and 1.2.

A first region 1.1 is assigned to an upper body 3.1, in particular a pelvic region of the passenger 3, and a second region 1.2 is assigned to a knee and lower leg region 3.2 of the passenger 3, wherein the airbag 1 extends in the activated and completely deployed condition between a front vehicle seat 4, i.e. a driver's seat or a passenger seat, and the passenger 3 in the rear compartment.

In its operating position, the airbag 1 serves as protection of the passenger 3 if he/she has not put on a seat belt assigned to his/her vehicle seat 5 shown i.a. in FIG. 2.

The passenger protection device having the airbag 1 as passenger protection means is, for example, only able to be activated when the vehicle 2 is driving with a current driving speed not exceeding a predetermined threshold value of, for example, 25 km/h. If the vehicle 2 has a current driving speed exceeding the threshold value, and the passenger 3 has not put on his/her seatbelt, it can be provided that a request is emitted to put on the seat belt. For example, monitoring with respect to putting on the seat belt upon exceeding the predetermined threshold value takes place, wherein monitoring can take place by means of seat occupancy detection, a belt buckle sensor for detecting a belt status and/or by means of detected signals of an interior camera.

The passenger protection device having the airbag 1 is provided for the protection of passengers 3 in the rear compartment of the vehicle 2 if he/she, for example in the event of a straight tailback of the vehicle 2, has taken off the seat belt for comfort reasons and the vehicle 2 collides with an object, for example a vehicle driving ahead.

In order to deploy the airbag 1, the airbag is fluidically connected to a gas generator (not depicted in more detail) and which ignites a pyrotechnic propellant upon activation, whereby a gas is released, by means of which the airbag 1, i.e. its two regions 1.1, 1.2, are able to be supplied. If the airbag 1 is completely deployed in its first embodiment, as shown in FIG. 1, it has its operating position.

A first region 1.1 of the airbag 1 comprises a tubular support structure 1.1.1, bearing structures 1.1.2 and two bearing volumes 1.1.3.

The support structure 1.1.1 can be supplied with the gas from the gas generator (not depicted in more detail), wherein the gas flows through a second region 1.2 into the first region 1.1 of the airbag 1. The support structure 1.1.1 is filled by the gas supply and is thereby deployed. The vertical sections of the support structure 1.1.1 are thereby erected.

The support structure 1.1.1 forms a framework, wherein the bearing structures 1.1.2 can be stretched by deployment of the support structure 1.1.1, the bearing structures encasing the respective bearing volumes.

When the support structure 1.1.1 is filled, the bearing structures 1.1.2 are stretched, wherein surrounding air is able to be sucked in through at least one inflow opening into an interior of the first region 1.1, whereby the respective bearing volume 1.1.3 is formed.

The second region 1.2 of the airbag 1 protrudes from the first region 1.1 and extends substantially in the vertical direction between the front vehicle seat 4 and the passenger 3 such that, as is depicted in more detail in FIG. 3 in particular, his/her knee and lower leg region 3.2 and also his/her feet 3.3 are protected by means of the airbag 1. The airbag 1 is thereby formed in the second region 1.2 as a single chamber-like fillable region that can be filled with gas.

The gas generator, which is fluidically connected to the airbag 1, is attached to the vehicle floor 7 in a footwell 6 assigned to the vehicle seat 5 of the passenger 3, which is also depicted in more detail in FIG. 3, wherein the airbag 1 is also located there in the unactivated condition. If the airbag 1 is activated, it is deployed from below, i.e., from the footwell 6 in the direction of the vehicle vertical axis upwards.

FIG. 2 shows a perspective view of a passenger 3 sitting in the vehicle seat 5 and of the activated airbag 1 in a second embodiment. In the second embodiment, the airbag 1 has a bearing volume 1.1.3 encased by the support structure 1.1.1 and the bearing structures 1.1.2.

In FIG. 3, a side view of the passenger 3 sitting in the vehicle seat 5 and the deployed airbag 1 is depicted.

Here, the airbag 1 is depicted in its operating position, in which the airbag 1 extends between the front vehicle seat 4 and the passenger 3.

By means of the bearing volume 1.1.3, a depth of the airbag 1, in particular of the first region 1.1, is able to be adjusted flexibly and automatically depending on a position of the front vehicle seat 4, wherein a protective effect of the airbag 1 is not impaired. This means that a required depth of the airbag 1 for an optimal protective effect of this is automatically adjusted depending on a distance between the passenger 3 and the front vehicle seat 4.

By means of the first region 1.1 of the airbag 1 assigned to the upper body region 3.1, the passenger 3 is fastened to his/her vehicle seat 5 in sections, wherein the first region 1.1, in particular, presses the pelvic region of the passenger 3 in the direction of the vehicle seat 5. The first region 1.1 of the airbag 1 is provided for retention of the pelvis, such that the passenger 3 is fastened to his/her vehicle seat 5.

In particular, the first region 1.1 of the airbag 1 provides protection for a passenger 3 who has not put on his/her seat belt.

If the passenger 3 has put on his/her seat belt, the first region 1.1 holds back the pelvis of the passenger 3, such that the risk of the passenger 3 sliding under the seat belt is at least reduced.

FIG. 4 depicts a lateral perspective view of the passenger 3 in his/her vehicle seat 5 with the activated airbag 1.

It is thereby shown how, in the completely deployed condition of the airbag 1, the second region 1.2 extends in the knee and lower leg region 3.2 of the passenger 3. As a result, contact of the knee and lower leg region 3.2 with the front vehicle seat 4 is ruled out to the greatest extent possible in the event of a collision of the vehicle 2 by means of the second region 1.2.

FIG. 5 shows a further perspective view of the passenger 3 in his/her vehicle seat 5 with the activated airbag 1 in its second embodiment.

Driving without a seat belt on until a predetermined driving speed is reached is possible by means of such an airbag 1 as protection against injury, wherein comfort for the passenger 3 is increased with corresponding safety. Straight tailbacks can thus be more pleasant for a passenger 3 in the rear compartment of the vehicle 2.

Although the present invention has been described above by means of embodiments with reference to the enclosed drawings, it is understood that various changes and developments can be implemented without leaving the scope of the present invention, as it is defined in the enclosed claims.

The invention claimed is:

1. A passenger protection device for a vehicle, the passenger protection device comprising:
    an airbag assigned to at least one passenger in a rear compartment of the vehicle,
    wherein, in event of an imminent collision of the vehicle being detected or in the event of a collision, the airbag is activated and filled with a gas,
    wherein the airbag has a form such that when the airbag is deployed in the activated and filled condition, the airbag is configured to be interposed between a front vehicle seat and a lower torso and pelvic region of the passenger and configured to be interposed between the front vehicle seat and a knee and lower leg region of the passenger,
    wherein the airbag is fluidically connected to a gas generator for deployment of the airbag, the gas generator, upon activation, releases the gas filling the airbag,
    wherein the airbag has a support structure that is fillable with the gas at least in a first region configured to press the pelvic region of the passenger towards a rear of the vehicle and to protect the lower torso and pelvic region of the passenger so that support structure bearing structures, which encase at least one bearing volume, are stretched by sucking in surrounding air through at least one inflow opening into an interior of the first region and forming the at least one bearing volume,
    wherein the airbag has a second region adjacent to the first region and configured to protect the knee and lower leg region of the passenger, the second region is a single fillable region,
    wherein the second region is fluidically connected to the support structure of the first region, and
    wherein the support structure is tubular.

2. The passenger protection device of claim 1, wherein the first region of the airbag comprises two bearing volumes.

3. The passenger protection device of claim 1, wherein, in the filled and deployed condition, the airbag extends at least over a width of the front vehicle seat.

4. The passenger protection device of claim 1, wherein the support structure and the bearing structures form the bearing volume.

5. The passenger protection device of claim 1, wherein the gas generator is attached to the vehicle floor in a footwell assigned to vehicle seat on which the at least one passenger is positioned.

6. The passenger protection device of claim 1, wherein at least sections of the gas generator are arranged beneath the front vehicle seat.

7. The passenger protection device of claim 1, wherein the airbag is directly attached to the gas generator.

8. A vehicle, comprising:
    a front vehicle seat;
    a rear vehicle seat upon which at least one passenger is positioned; and
    an airbag configured to protect the at least one passenger,
    wherein, in event of an imminent collision of the vehicle being detected or in the event of a collision, the airbag is activated and filled with a gas,
    wherein the airbag has a form such that when the airbag is deployed in the activated and filled condition, the airbag is configured to be interposed between a front vehicle seat and a lower torso and pelvic region of the passenger and configured to be interposed between the front vehicle seat and a knee and lower leg region of the passenger,
    wherein the airbag is fluidically connected to a gas generator for deployment of the airbag, the gas generator, upon activation, releases the gas filling the airbag,
    wherein the airbag has a support structure that is fillable with the gas at least in a first region configured to press the pelvic region of the passenger towards a rear of the vehicle and to protect the lower torso and pelvic region of the passenger so that support structure bearing structures, which encase at least one bearing volume, are stretched by sucking in surrounding air through at least one inflow opening into an interior of the first region and forming the at least one bearing volume,
    wherein the airbag has a second region adjacent to the first region and configured to protect the knee and lower leg region of the passenger, the second region is a single fillable region,
    wherein the second region is fluidically connected to the support structure of the first region, and
    wherein the support structure is tubular.

9. The vehicle of claim 8, wherein the first region of the airbag comprises two bearing volumes.

10. The vehicle of claim 8, wherein, in the filled and deployed condition, the airbag extends at least over a width of the front vehicle seat.

11. The vehicle of claim 8, wherein the support structure and the bearing structures form the bearing volume.

12. The vehicle of claim 8, wherein the gas generator is attached to the vehicle floor in a footwell assigned to vehicle seat on which the at least one passenger is positioned.

13. The vehicle of claim 8, wherein at least sections of the gas generator are arranged beneath the front vehicle seat.

14. The vehicle of claim 8, wherein the airbag is directly attached to the gas generator.

15. A method of deploying an airbag assigned to at least one passenger in a rear compartment of the vehicle, the method comprising:
    activating and filling the airbag with gas by a gas generator fluidically connected to the airbag in response to detection of an imminent collision of the vehicle or in response to detection of a collision;

wherein filling the airbag causes the airbag to move from a stored position to a deployed position in which the airbag is configured to be interposed between a front vehicle seat and a lower torso and pelvic region of the passenger and configured to be interposed between the front vehicle seat and a knee and lower leg region of the passenger, wherein in the deployed position a support structure of the airbag is filled with the gas at least in a first region configured to protect the lower torso and pelvic region of the passenger so that support structure bearing structures encasing at least one bearing volume are stretched, wherein in the deployed position a second region of the airbag, which is adjacent to the first region, is configured to press the pelvic region of the passenger towards a rear of the vehicle and to protect the knee and lower leg region of the passenger, wherein the second region is a single fillable region, wherein the second region is fluidically connected to the support structure of the first region, wherein the support structure is tubular, and wherein the airbag is only activated when a current driving speed of the vehicle is below a predetermined threshold value.

16. The method of claim 15, wherein the first region of the airbag comprises two bearing volumes.

17. The method of claim 15, wherein, in the filled and deployed condition, the airbag extends at least over a width of the front vehicle seat.

* * * * *